US011747497B2

(12) United States Patent
Pei et al.

(10) Patent No.: US 11,747,497 B2
(45) Date of Patent: Sep. 5, 2023

(54) SEAFLOOR MULTI-WAVE SEISMIC SOURCE AND SEAFLOOR EXPLORATION SYSTEM

(71) Applicant: FIRST INSTITUTE OF OCEANOGRAPHY, MNR, Qingdao (CN)

(72) Inventors: Yanliang Pei, Qingdao (CN); Kai Liu, Qingdao (CN); Mingming Wen, Qingdao (CN); Chenguang Liu, Qingdao (CN); Yifan Huang, Qingdao (CN); Liancheng Zhang, Qingdao (CN); Keping Yan, Qingdao (CN); Baohua Liu, Qingdao (CN)

(73) Assignee: FIRST INSTITUTE OF OCEANOGRAPHY, MNR, Qingdao (CN)

( * ) Notice: Subject to any disclaimer, the term of this patent is extended or adjusted under 35 U.S.C. 154(b) by 0 days.

(21) Appl. No.: 17/683,258

(22) Filed: Feb. 28, 2022

(65) Prior Publication Data
US 2022/0342099 A1    Oct. 27, 2022

(30) Foreign Application Priority Data
Apr. 22, 2021 (CN) .......................... 202110435822.2

(51) Int. Cl.
*G01V 1/00* (2006.01)
(52) U.S. Cl.
CPC ...... *G01V 1/005* (2013.01); *G01V 2210/1297* (2013.01)
(58) Field of Classification Search
CPC ........... G01V 1/005; G01V 2210/1297; G01V 1/3852
See application file for complete search history.

(56) References Cited

U.S. PATENT DOCUMENTS 5,189,642 A * 2/1993 Donoho .................... G01V 1/24
367/15
8,830,794 B2 * 9/2014 Ruet ...................... G01V 1/133
367/140
(Continued)

FOREIGN PATENT DOCUMENTS

CN        211402259 U   * 9/2020
CN        112462429 A     3/2021
(Continued)

OTHER PUBLICATIONS

KR-100945693-B1 Machine Translation (Year: 2007).*
(Continued)

*Primary Examiner* — Yuqing Xiao
*Assistant Examiner* — Christopher Richard Walker
(74) *Attorney, Agent, or Firm* — J.C. Patents

(57) ABSTRACT

The present application provides a seafloor multi-wave seismic source including: a pressure chamber mechanism; a high-voltage pulse generator with four discharge pathways; a thrust mechanism with a thrust rod and a thrust head; four vibrators are evenly distributed around a periphery of the thrust head, and each vibrator is connected with one discharge pathway of the high-voltage pulse generator; a power supply unit to power the seismic source; and a processor, a memory and a program, wherein the program is stored in the memory and configured to be executed by the processor; and the program includes: pulse emission instructions generated by the processor based on user settings and received by the high-voltage pulse generator, for switching on four or any two of the four discharge pathways at the same time, to enable the corresponding vibrators to vibrate to excite seismic waves in compression wave mode or shear wave mode.

18 Claims, 12 Drawing Sheets

(56) References Cited

U.S. PATENT DOCUMENTS

| | | | | |
|---|---|---|---|---|
| 9,507,039 B2* | 11/2016 | Kamata | | G01V 1/153 |
| 2001/0028602 A1* | 10/2001 | Dubois | | G01V 1/02 |
| | | | | 367/140 |
| 2011/0011668 A1* | 1/2011 | Hampshire | | G01V 1/047 |
| | | | | 181/113 |
| 2014/0198607 A1* | 7/2014 | Etienne | | G01V 1/3852 |
| | | | | 367/14 |
| 2016/0047923 A1* | 2/2016 | Kröling | | G01V 1/159 |
| | | | | 181/120 |
| 2017/0108600 A1* | 4/2017 | Gresillon | | G01V 1/159 |
| 2018/0128927 A1* | 5/2018 | Tenghamn | | G01V 1/005 |
| 2018/0335537 A1* | 11/2018 | Goujon | | G01V 1/3835 |
| 2019/0369281 A1* | 12/2019 | Pei | | G01V 1/3843 |
| 2020/0200930 A1* | 6/2020 | Parmeshwar | | G01V 13/00 |
| 2020/0386902 A1* | 12/2020 | Xing | | G01V 1/04 |
| 2021/0031890 A1* | 2/2021 | Alshuhail | | B63G 8/08 |
| 2021/0096245 A1* | 4/2021 | Kozuki | | G01S 15/89 |
| 2021/0132242 A1* | 5/2021 | Sallas | | G01V 1/145 |
| 2022/0113442 A1* | 4/2022 | Wang | | G01V 1/164 |

FOREIGN PATENT DOCUMENTS

| | | | | |
|---|---|---|---|---|
| CN | 112612058 A | | 4/2021 | |
| CN | 112649840 A | * | 4/2021 | G01V 1/20 |
| KR | 100945693 B1 | * | 7/2007 | |
| WO | WO-2014094515 A1 | * | 6/2014 | H03K 3/57 |

OTHER PUBLICATIONS

CN-211402259-U Machine Translation (Year: 2020).*
WO-2014094515-A1 Machine Translation (Year: 2014).*
CN-112649840-A Machine Translation (Year: 2021).*

* cited by examiner

SEAFLOOR MULTI-WAVE SEISMIC SOURCE AND SEAFLOOR EXPLORATION SYSTEM

CROSS REFERENCE TO RELATED APPLICATION

The present application claims the priority benefit of Chinese application No. 202110435822.2, filed on Apr. 22, 2021, entitled "Seafloor Multi-Wave Seismic Source and Seafloor Exploration System", the entirety of which is hereby incorporated by reference.

TECHNICAL FIELD

The present application relates to the technical field of ocean exploration, in particular to a seafloor multi-wave seismic source and a seafloor exploration system.

BACKGROUND ART

In conventional ocean seismic exploration, an oceanographic research vessel usually tows an acoustic excitation system (a seismic source 1') on the sea surface, as shown in FIG. 1. A seismic source system comprises a seismic source 1' towed on the sea surface and an indoor system. Acoustic waves (seismic waves) emitted from the seismic source 1' propagate in seawater and are reflected by the seafloor, received and collected by ocean bottom seismometers (OBS) 2', and further calculated and mapped by a computing system to analyze geological conditions of the seafloor.

When the conventional method is adopted for seismic exploration in waters, seawater can only propagate compression waves because seawater neither provides nor carries shear elastic force, so the seismic waves reflected by the stratum and received by the OBSs are dominated by compression waves, which makes it difficult to further improve the resolution of seafloor seismic data and the quality of stratum imaging.

SUMMARY OF THE INVENTION

An objective of the present application is to provide a seafloor multi-wave seismic source that can generate compression waves and shear waves for seafloor exploration, and a seafloor exploration system based on the seismic source, so as to overcome some shortcomings in the prior art and to solve the problem of low resolution of seafloor seismic exploration in waters.

According to a first aspect of the present application, a seafloor multi-wave seismic source is provided, including:
  a pressure chamber mechanism;
  a high-voltage pulse generator, comprising four discharge pathways and located in the pressure chamber mechanism;
  a seismic source thrust mechanism, comprising a thrust rod and a thrust head mounted at one end of the thrust rod; four vibrators are evenly distributed around a periphery of the thrust head, and each vibrator is connected with one discharge pathway of the high-voltage pulse generator;
  a power supply unit, configured to power the seafloor multi-wave seismic source; and
  at least one processor, a memory and at least one program, wherein the at least one program is stored in the memory and configured to be executed by the at least one processor; and the at least one program includes: pulse emission instructions generated by the processor based on user settings and received by the high-voltage pulse generator, for switching on four or any two of the four discharge pathways at the same time, to enable the corresponding vibrators to vibrate to excite seismic waves in compression wave mode or shear wave mode.

As an optional embodiment, the seafloor multi-wave seismic source is located on the seafloor during operation and further includes an underwater acoustic communication unit configured to communicate with an sea surface control terminal; the at least one program includes: instructions received by the underwater acoustic communication unit, for acquiring user settings from or updating user settings by the sea surface control terminal, and sending the acquired or updated user settings to the processor; the user settings include a seismic source excitation mode, seismic source excitation energy and a seismic source excitation interval, and the seismic source excitation mode comprises the shear wave mode and the compression wave mode.

As an optional embodiment, the seafloor multi-wave seismic source further includes a counterweight base, and the pressure chamber mechanism is mounted on the counterweight base through a release mechanism; the program further includes: release instructions from the sea surface control terminal and received by the underwater acoustic communication unit, for releasing the counterweight base; the received release instructions are sent to the processor; and the processor controls the release mechanism to release the counterweight base.

As an optional embodiment, the thrust head of the seismic source thrust mechanism includes a thrust head main body and a head portion, wherein a periphery of the thrust head main body is a cylinder or a rectangular prism, the four vibrators are distributed evenly and symmetrically along the periphery of the thrust head main body, and the head portion is a cone.

As an optional embodiment, the seismic source thrust mechanism further includes a bracket and a motor; the seismic source thrust mechanism is mounted through the bracket, and the thrust rod is movably mounted on the bracket and able to rotate and move up and down along the bracket; the motor is connected with the thrust rod to control the thrust rod to rotate or move up and down; and the program further includes: startup instructions from the processor for starting the motor to start operation; and stop instructions from the processor for stopping the motor to stop operation.

As an optional embodiment, the motor is a stepping motor, and the thrust rod is a screw rod body; and the stepping motor is connected with the screw rod body to drive the rod body to rotate and move up and down.

As an optional embodiment, each vibrator includes: an insulating shell; a flexible protective film connected with and spaced from the insulating shell to form a vibrator cavity; a metal sheet mounted in the vibrator cavity and connected with the flexible protective film; and a coil disposed on the metal sheet and connected with one discharge pathway of the high-voltage pulse generator; the vibrator is connected to the thrust head or the thrust head main body through the insulating shell.

As an optional embodiment, there are 20-40 turns of the coil of each vibrator, preferably 30 turns; and the volume of the vibrator cavity of each vibrator is 5 to 50 $cm^3$, preferably 10 $cm^3$.

As an optional embodiment, an instantaneous voltage output from the high-voltage pulse generator is greater than 1,000V.

As an optional embodiment, the high-voltage pulse generator is provided with a multiplex storage capacitor circuit, including four storage capacitor banks each comprising one or more high-voltage pulse capacitors connected in parallel; an output terminal of each storage capacitor bank is correspondingly connected to one vibrator; and two ends of each storage capacitor bank are respectively provided with an isolating diode.

As an optional embodiment, the high-voltage pulse generator further includes a multiplex switch circuit, including four discharge circuits; an input terminal of each discharge circuit is connected to one storage capacitor bank correspondingly, while an output terminal of the discharge circuit is connected to one vibrator correspondingly; each discharge circuit further includes a set of solid-state switch and flywheel diode, wherein the solid-state switch is connected in series with the corresponding vibrator and the flywheel diode is connected in parallel with the corresponding vibrator.

As an optional embodiment, the seafloor multi-wave seismic source further includes a hydrophone disposed on an outer wall of the pressure chamber mechanism and configured to receive wavelet signals; the program further includes: instructions received by the hydrophone for acquiring wavelet signals in real time and storing the acquired wavelet signals in the memory; and determining, by the processor, whether the hydrophone normally receives wavelet signals or not; if the wavelet signals are received normally, it is judged that the seafloor multi-wave seismic source is in normal operation; if the wavelet signals are not received normally, it is judged that the seafloor multi-wave seismic source or the hydrophone is malfunctioning.

As an optional embodiment, the seafloor multi-wave seismic source further includes a HMI unit disposed in the pressure chamber mechanism and connected with the processor; the HMI unit is provided with an I/O interface configured to input user settings and retrieve seismic source data.

As an optional embodiment, the seafloor multi-wave seismic source further includes a RDSS and a local clock, wherein the RDSS provides positioning service, time service and short message service for the seafloor multi-wave seismic source and the local clock provides clock information for the processor.

As an optional embodiment, the pressure chamber mechanism is further provided with a compass, and the processor receives signals from the compass to obtain geographic orientation information of the seafloor multi-wave seismic source.

As an optional embodiment, the seafloor multi-wave seismic source includes a master computer and a slave computer, wherein the processor is the master computer, and the slave computer includes a thrust unit, a release unit and a wavelet recording unit; wherein the thrust unit is configured to communicate with the motor and receive instructions from the processor to control the startup and stop of the motor; the release unit is configured to communicate with the release mechanism and receive release instructions from the processor to control the startup of the release mechanism; and the wavelet recording unit is configured to communicate with the hydrophone to receive and store the wavelet signals from the hydrophone.

As an optional embodiment, the pressure chamber mechanism includes a first pressure chamber and a second pressure chamber, both fixedly mounted by a seismic source frame, and the bracket for mounting the seismic source thrust mechanism is provided on the seismic source frame; wherein, the underwater acoustic communication unit, the release unit, the RDSS, the compass, the HMI unit, the processor, the wavelet recording unit and the memory are located in the first pressure chamber; and the thrust unit, the high-voltage pulse generator and the power supply unit are located in the second pressure chamber.

According to a second aspect of the present application, a seafloor exploration system is provided, including at least one seafloor multi-wave seismic source described in any of the above embodiments and at least one ocean bottom seismometer, and the ocean bottom seismometer is able to receive seismic waves excited by the seafloor multi-wave seismic source, including shear waves and compression waves. The seafloor multi-wave seismic source and the ocean bottom seismometer are both located on the seafloor during operation.

As an optional embodiment, the seafloor exploration system includes a plurality of exploration rows, and any two adjacent exploration rows form an exploration subsystem consisting of a first exploration row and a second exploration row; the first exploration row and the second exploration row both include the ocean bottom seismometers and the seafloor multi-wave seismic sources arranged at intervals; the seafloor multi-wave seismic sources in the first exploration row are located correspondingly to the ocean bottom seismometers in the second exploration row.

As an optional embodiment, the seafloor exploration system includes a plurality of exploration rows, and any two adjacent exploration rows form an exploration subsystem consisting of a first exploration row and a second exploration row; the first exploration row includes the ocean bottom seismometers and the seafloor multi-wave seismic sources arranged at intervals, and the second exploration row includes the ocean bottom seismometers arranged at intervals; the seafloor multi-wave seismic sources and the ocean bottom seismometers in the first exploration row are located correspondingly to the ocean bottom seismometers in the second exploration row.

Compared with the prior art, the advantages and positive effects of the present application are as follows.

(1) Unlike existing towed seismic sources, the seismic source in at least one embodiment of the present application is a seafloor seismic source that does not need to be towed by the research vessel or to be powered by the research vessel. Moreover, it is located on the seafloor during operation and can be recovered after use. The seismic source excites seismic waves on the seafloor, thus avoiding energy loss due to long-distance propagation of excited seismic waves in seawater, and increasing the penetration depth into strata.

(2) The seismic waves excited by the seismic source at the seafloor provided in at least one embodiment of the present application can be compression waves and shear waves with high resolution. However, conventional seismic sources operating in seawater can only excite compression waves due to the fact that no shear waves can propagate in seawater.

(3) The seafloor exploration system based on the seafloor multi-wave seismic source provided in at least one embodiment of the present application is a distributed seismic source exploration system, through which a large number of seafloor multi-wave seismic sources can be distributed on the seafloor to allow distributed and collaborative operation with a large number of OBSs.

Figure 1:
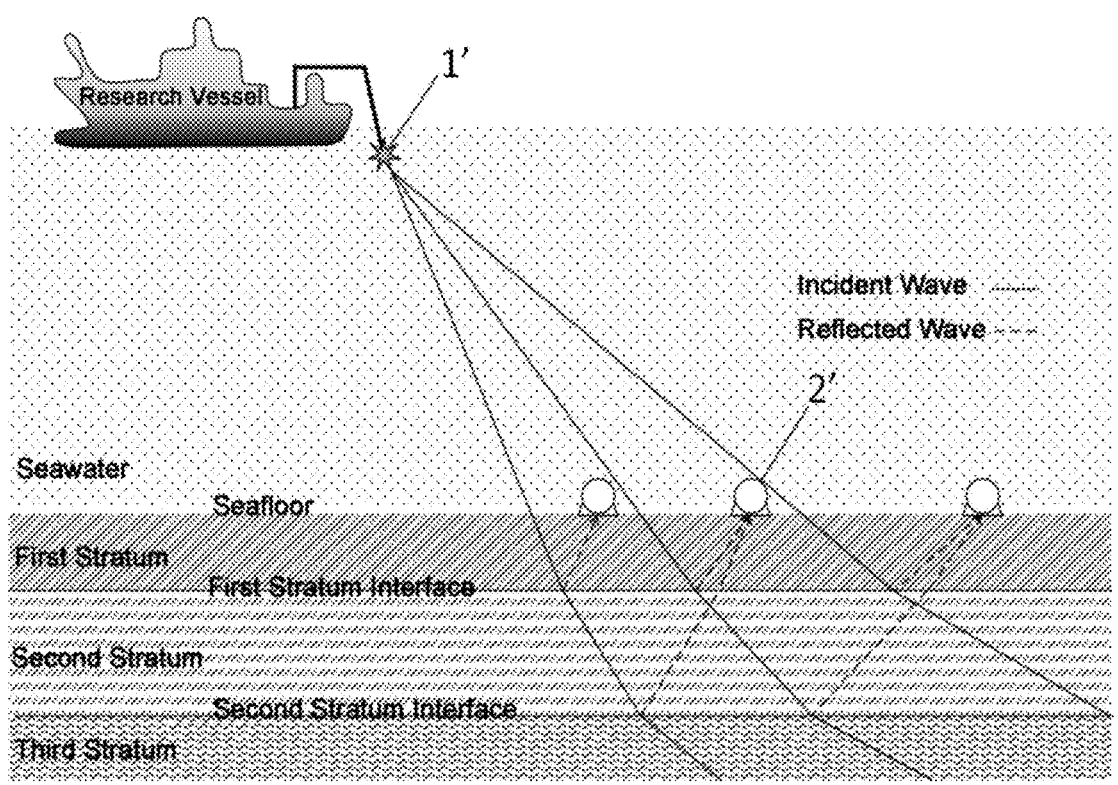
FIG. 1 is a structural diagram of a towed seismic source in the prior art.
Figure 2:
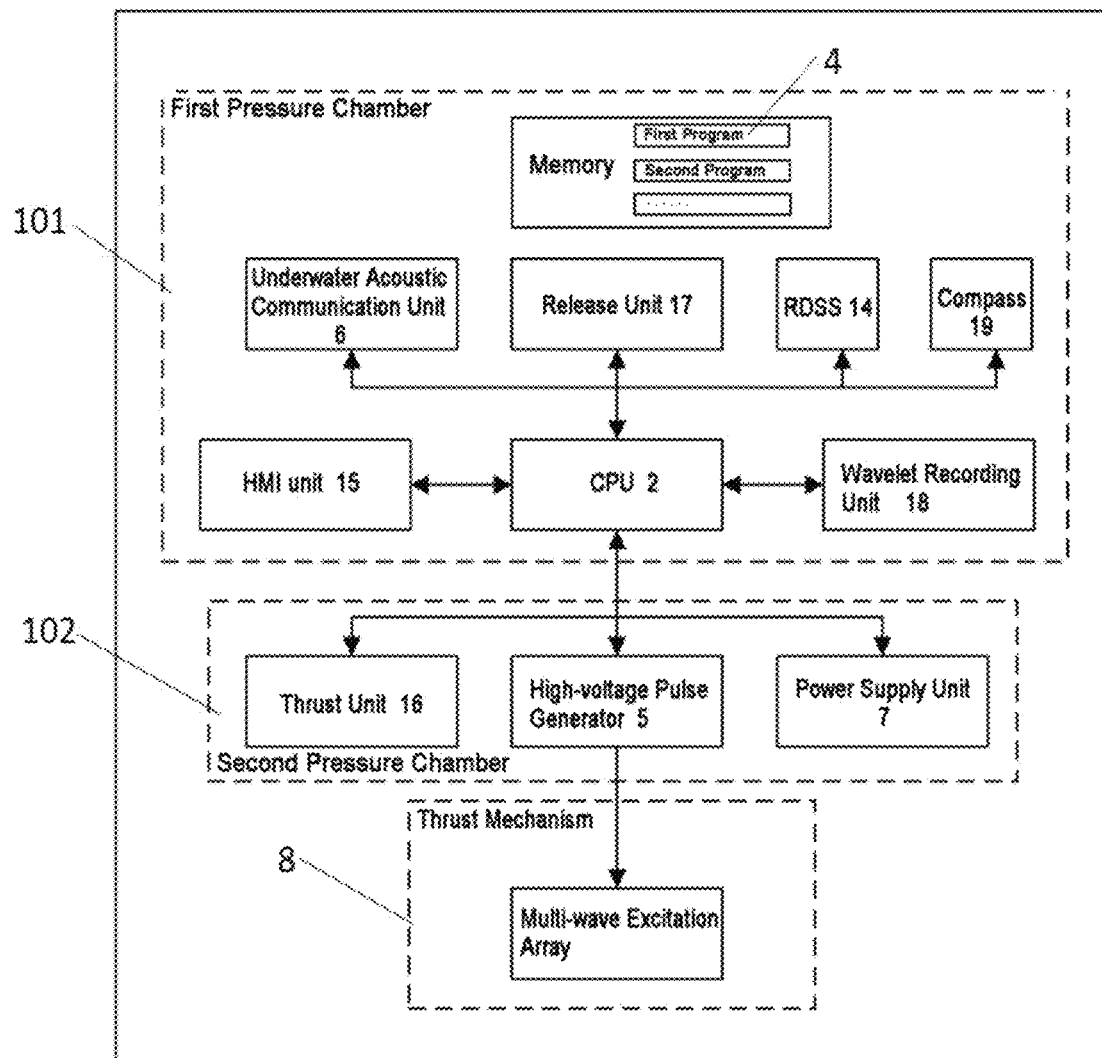
FIG. 2 is a logic block diagram of a seafloor multi-wave seismic source according to one embodiment of the present application.
Figure 3:
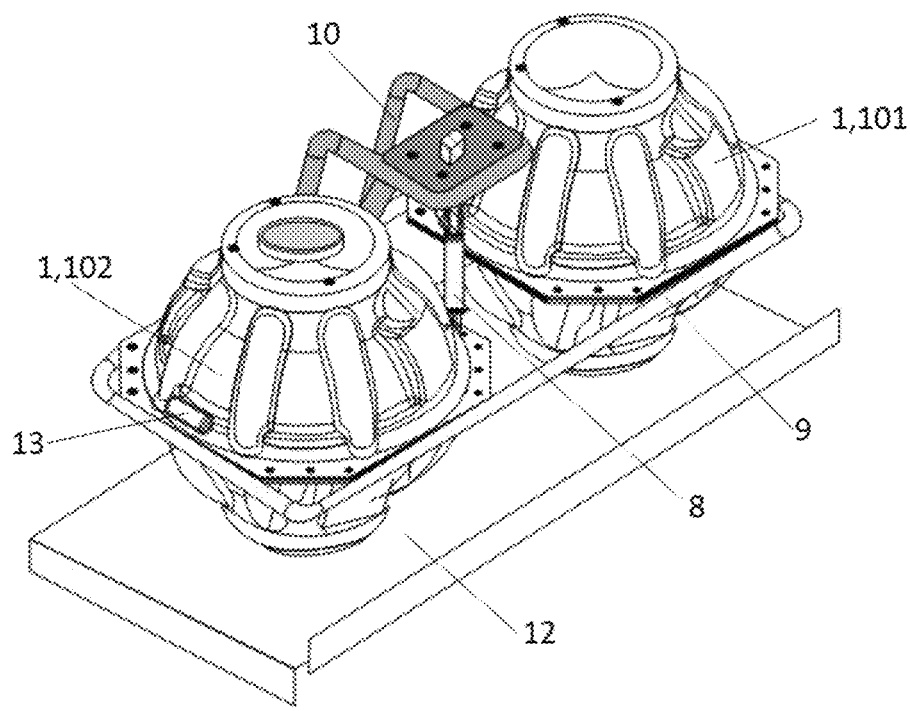
FIG. 3 is a structural diagram of a seafloor multi-wave seismic source according to one embodiment of the present application.

in which:

1' seismic source, 2' ocean bottom seismometer, 1 pressure chamber mechanism, 2 CPU, 3 memory, 4 program, 5 high-voltage pulse generator, 6 underwater acoustic communication unit, 7 power supply unit, 8 seismic source thrust mechanism, 81 thrust rod, 82 thrust head, 83 motor, 9 seismic source frame, 10 bracket, 11 vibrator, 111 first vibrator, 112 second vibrator, 113 third vibrator, 114 fourth vibrator, 1101 insulating shell, 1102 flexible protective film, 1103 vibrator cavity, 1104 metal sheet, 1105 high-voltage coil, 12 counterweight base, 13 hydrophone, 14 RDSS, 15 HMI unit, 16 thrust unit, 17 release unit, 18 wavelet recording unit, and 19 compass.

DETAILED DESCRIPTION OF THE EMBODIMENTS

The technical solutions of the present application will be described in detail below in combination with specific embodiments. However, it should be understood that elements, structures and features in one embodiment may also be advantageously incorporated into other embodiments without further description.

In the description of the present application, it should be noted that the terms "up", "down", "front", "back" and the like indicate the positional or positional relationship according to the positional relationship shown in the drawings merely for the convenience of describing the present application and the simplified description, but do not indicate or imply a devices or an element referred to must be of a particular orientation, constructed and operated in a particular orientation and therefore should not be construed as limiting the present application.

It should be noted that when an element is referred to as being "disposed on," "connected to," or "fixed to" another element, it can be directly on the other element or indirectly on the other element. When an element is referred to as being "connected to" another element, it can be directly connected to the other element or indirectly connected to the other element. "Control", "controlling" and "controlled" in this application may be direct control or indirect control. Furthermore, the terms "first" and "second" are used for descriptive purposes only and should not be construed to indicate or imply relative importance.

In a first embodiment of the present application, a seafloor multi-wave seismic source is provided, including a pressure chamber mechanism 1, and a Central Processing Unit (CPU) 2, a memory 3 and at least one program 4 located in the pressure chamber mechanism 1, wherein the at least one program 4 is stored in the memory 3 and configured to be executed by the CPU 2. The seafloor multi-wave seismic source further includes a high-voltage pulse generator 5, an underwater acoustic communication unit 6, and a power supply unit 7 which supply power to the seafloor multi-wave seismic source and which can be located in the pressure chamber mechanism 1. A seismic source thrust mechanism 8 is disposed outside the pressure chamber mechanism 1.

There may be one or more pressure chambers for the pressure chamber mechanisms 1. In order to reduce the interaction effect between components of the seafloor multi-wave seismic source, in the present embodiment, the pressure chamber mechanism includes a first pressure chamber 101 and a second pressure chamber 102 disposed in parallel, and some components (especially electronic components) of the seafloor multi-wave seismic source are provided in the two pressure chambers, respectively. The first pressure chamber 101 and the second pressure chamber 102 are fixedly connected together through a seismic source frame 9.

The seismic source frame 9 is the main supporting frame of the seafloor multi-wave seismic source. A bracket 10 for mounting the seismic source thrust mechanism 8 is disposed on the seismic source frame 9.

Figure 7:
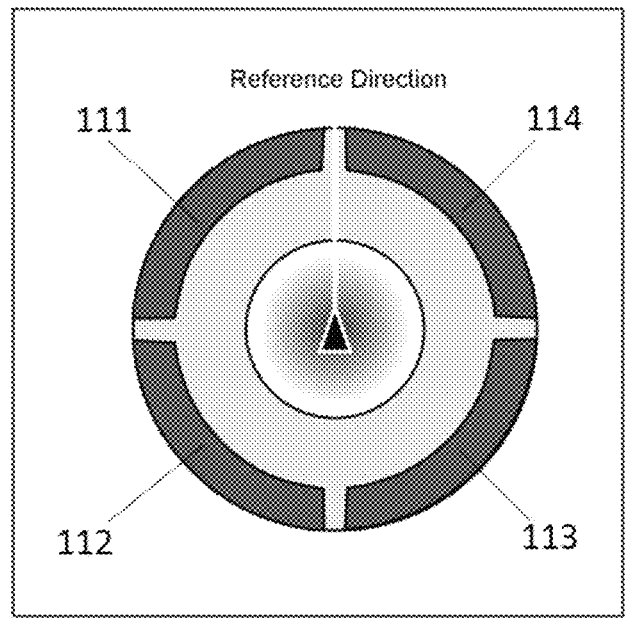
FIG. 7 is a mounting diagram of the vibrator according to one embodiment.

As the main mechanism for emitting seismic waves, the seismic source thrust mechanism 8 is excited by the high-voltage pulse generator 5 to generate seismic waves. Specifically, the seismic source thrust mechanism 8 includes a thrust rod 81 and a thrust head 82 mounted at one end of the thrust rod. The thrust head 82 includes a thrust head main body 821, the periphery of the main body 821 is a cylinder or a rectangular prism, and a head portion 822 of the thrust head 82 is a cone that may be inserted into the seafloor sedimentary layer. Four vibrators 11 are evenly distributed on the periphery of the thrust head main body. As shown in FIG. 7 which is a bottom view, the vibrators 11 are defined as a first vibrator 111, a second vibrator 112, a third vibrator 113 and a fourth vibrator 114 in sequence counterclockwise, with a gap between any two adjacent vibrators. The direction between the first vibrator 111 and the fourth vibrator 114 is defined as a reference direction O. Each vibrator is connected with one discharge pathway of the high-voltage pulse generator respectively to form a multi-wave excitation array.

Figure 6A:
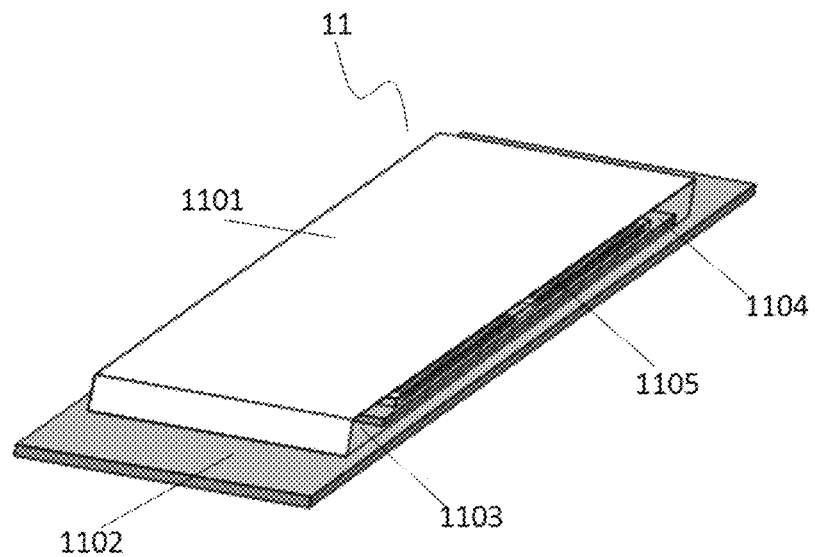
FIG. 6a is a perspective structural diagram of a vibrator according to one embodiment.
Figure 6B:
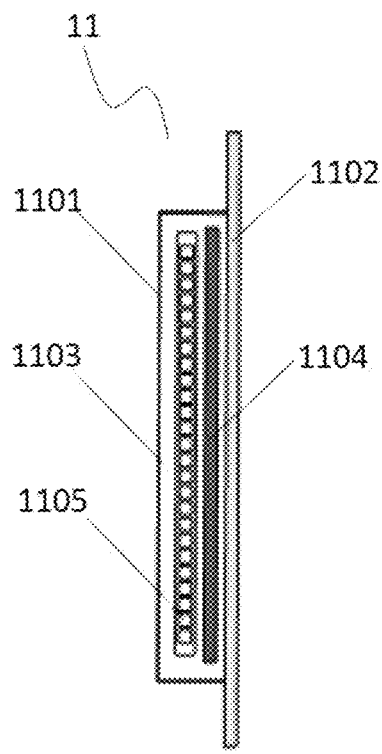
FIG. 6b is a side view of the vibrator.

Further, with its structure shown in FIG. 6, each vibrator 11 includes:

an insulating shell 1101;

a flexible protective film 1102, connected with and spaced from the insulating shell 1101 to form a vibrator cavity 1103;

a metal sheet 1104, mounted in the vibrator cavity 1103 and connected with the flexible protective film 1102; and a high-voltage coil 1105, disposed on the metal sheet 1104 and connected with one discharge pathway of the high-voltage pulse generator.

Each vibrator is connected to the thrust head main body 821 through the insulating shell 1101.

The high-voltage coil 1105 is controlled to have 10 to 100 turns, preferably 20 to 40 turns, such as 20, 25, 30, 35, and 40 turns, etc. The volume of the vibrator cavity 1103 is controlled to be 5 to 50 cm³, such as 10, 15, 20, 25, 30, 35, 40, and 45 cm³, etc. In this way, the vibrator can vibrate at a low frequency to propagate further.

The vibrators 11 are inserted into the seafloor sedimentary layer through the seismic source thrust mechanism 8 during operation. Through the instantaneous release of high voltage, a strong current is generated in the high-voltage coil 1105, and a current (eddy current) in a direction opposite to that in the high-voltage coil 1105 is generated in the metal sheet 1104. The electromagnetic induction between the high-voltage coil and the metal sheet 1104 forces the metal sheet 1104 to quickly detach from the high-voltage coil 1105, thus driving the flexible protective film 1102 to bombard the surrounding sediments, generating acoustic waves in the sediments and forming seismic waves. The air inside the insulating shell 1101 acts like a spring, so that the metal sheet 1104 is confined within a given movement range while detaching from the coil 1105, and is pulled back to its original position after reaching the maximum distance.

The high-voltage pulse generator 5 includes four discharge pathways connecting with one of the four vibrators 11 respectively to cooperate with the excitation of the multi-wave excitation array of the seismic source thrust mechanism 8. The high-voltage pulse generator 5 may be configured to convert a low-voltage direct-current (DC) power supply into a high-voltage pulse power supply, to power the vibrators 11 of the multi-wave excitation array for vibration. Preferably, the instantaneous voltage of the pulse power supply output by the high-voltage pulse generator 5 may be greater than 1,000V and the instantaneous current of the same may be greater than 1,000 A. In the present embodiment, the high-voltage pulse generator 5 may adopt a high-voltage pulse generator with a high-voltage pulse circuit in the prior art, e.g., a high-voltage pulse generator that can convert a 220V DC power supply into a 5,600V pulse power supply and specifically the input DC power and the output pulse power supply can be adjusted according to actual requirements. Therefore, it can be understood that high voltage and low voltage in the present application are relative concepts subject to actual requirements. For example and without limitation, the low voltage may be 220V, and the high voltage may be greater than 1,000V.

Figure 4:
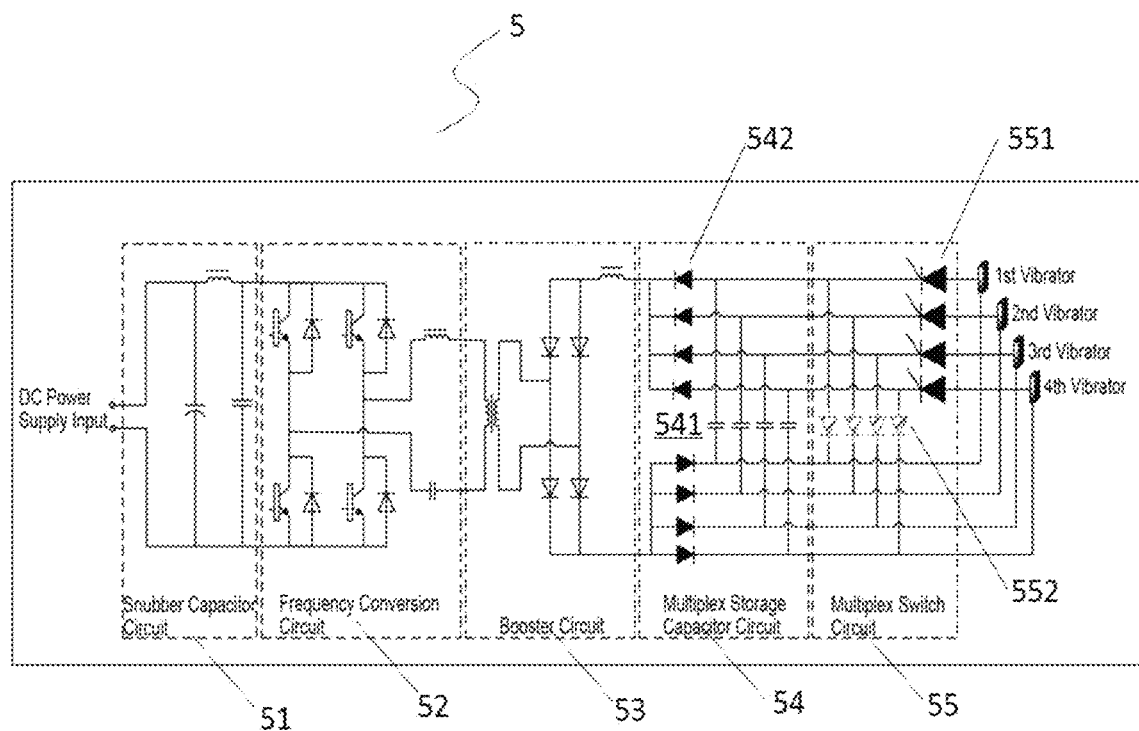
FIG. 4 is a structural diagram of a high-voltage pulse generator according to one embodiment.

As an optional embodiment, as shown in FIG. 4, the circuit structure of the high-voltage pulse generator 5 includes a snubber capacitor circuit 51, a frequency conversion circuit 52, a booster circuit 53, a multiplex storage capacitor circuit 54, and a multiplex switch circuit 55.

The snubber capacitor circuit 51, with its input terminal connected with a DC power supply, includes an electrolytic capacitor and a ceramic capacitor disposed in parallel, as well as a first inductor disposed in series with the two capacitors. The circuit is configured to store part of the electric power in advance, which can effectively reduce the instantaneous demand for power supply in the process of charging the multiplex storage capacitor circuit 54, and reduce the impact of impulse current and the power loss.

The frequency conversion circuit 52, with its input terminal connected with an output terminal of the snubber capacitor circuit 51, may adopt an IGBT (Insulated Gate Bipolar Transistor) conversion circuit, including an IGBT full-bridge circuit, an IGBT control circuit (not shown), and a second capacitor and a second inductor disposed in series at two output terminals respectively; wherein four IGBTs in the IGBT full-bridge circuit are divided into two groups with each group switched on and off at the same time. The CPU 2 controls the IGBT control circuit to provide excitation pulse control signals to switch the two groups of IGBTs on and off alternately. The circuit is configured to convert low-frequency DC from the DC power supply into high-frequency AC (Alternating Current). For example, it can convert 50 Hz low-frequency DC into 100 kHz high-frequency AC, which may also be subject to actual requirements in specific cases. In this way, the size and weight of the booster circuit can be effectively reduced. In the present embodiment, the frequency conversion circuit 52 chooses the IGBT conversion circuit which is switched on and off under the control of the CPU 2, so as to control the charging voltage of the multiplex storage capacitor circuit 54. For example, after the voltage reaches a certain voltage, the frequency conversion circuit 52 stops operating, so as to stop charging the multiplex storage capacitor circuit 54.

The booster circuit 53, with its input terminal connected with an output terminal of the frequency conversion circuit 52, includes a booster transformer and a bridge rectifier circuit consisting of four first diodes; wherein the booster transformer is configured to boost the high-frequency AC voltage from the frequency conversion circuit 52, and then the boosted AC voltage is converted into DC high voltage by the bridge rectifier circuit (e.g., the boosted voltage may be as high as 5,600V).

The multiplex storage capacitor circuit 54, with its input terminal connected with an output terminal of the booster circuit 53, includes four storage capacitor banks each consisting of one or more high-voltage pulse capacitors 541 connected in parallel. An output terminal of each storage capacitor bank is correspondingly connected to one vibrator 11, and two ends of each storage capacitor bank are respectively provided with an isolating diode 542, to avoid inter-channel interference of the multiplex storage capacitor banks during charging and discharging.

The multiplex switch circuit 55 includes four discharge circuits; an input terminal of each discharge circuit is connected to one storage capacitor bank correspondingly, while an output terminal thereof is connected to one vibrator 11 correspondingly. Each discharge circuit further includes a set of solid-state switch 551 and flywheel diode 552, wherein the solid-state switch 551 is connected in series with the corresponding vibrator 552 and the flywheel diode is connected in parallel with the corresponding vibrator. The vibration of the corresponding vibrator 11 can be controlled by controlling the on/off of the solid-state switches 551 on the four discharge circuits. After the switch is switched on, the electric power of the storage capacitor bank is output to the vibrator 11 of the corresponding discharge circuit to excite acoustic waves. Since the solid-state switches 551 in the multiplex switch circuit 55 can be switched on asynchronously, the voltage drop of each storage capacitor may differ, and the isolating diodes 542 across each storage capacitor play a role of isolation, which avoids the high-voltage capacitor bank from charging the low-voltage capacitor bank, and also avoids the problem that the solid-state switch 551 is broken down by too fast current rise due to the superimposed currents from multiple circuits into a certain circuit.

In the present application, at least four discharge pathways connected to the four vibrators 11 can be formed in the high-voltage pulse generator 5 by the above embodiment. It can be understood that the above functions may also be realized by reasonably changing some circuits in the high-voltage pulse generator 5, so the above circuit structure of the high-voltage pulse generator 5 does not constitute a limitation to the present application.

The underwater acoustic communication unit 6 in the pressure chamber mechanism 1 is a receiving transducer for communication between the seafloor multi-wave seismic source distributed on the seafloor and a sea surface control terminal (not shown). The sea surface control terminal is usually disposed on the research vessel sailing at sea, and includes an operation interface and a transmitting transducer. The operation interface is provided with a display and an input terminal, and can display and input relevant operation instructions which are transmitted to the receiving transducer 6 through the transmitting transducer. Therefore, the instructions sent from the sea surface control terminal can be transmitted to the CPU 2 through the underwater acoustic communication unit 6, and the CPU 2 controls the operation of the seafloor multi-wave seismic source. The underwater acoustic communication technology using the transmitting transducer and the receiving transducer is already a relatively mature technology, which can be adopted in the present embodiment to realize the communication between the sea surface control terminal and the seafloor multi-wave seismic source.

The program includes:
- instructions received by the underwater acoustic communication unit 6, for acquiring user settings from or updating user settings by the sea surface control terminal, and sending the acquired or updated user settings to the CPU 2;
- pulse emission instructions generated by the CPU 2 based on the user settings and received by the high-voltage pulse generator 5, for switching on two or four of the four discharge pathways, to enable the corresponding vibrators to vibrate to excite seismic waves.

The user settings mainly include information such as seismic source excitation modes, seismic source excitation energy and seismic source excitation intervals, etc. The user settings may be stored in the memory 3 in advance (e.g., through the Human Machine Interface unit 15), and the CPU 2 sends instructions to the high-voltage pulse generator 5 based on the stored user settings to excite seismic waves; when the user settings need to be updated (for example, information such as seismic source excitation energy and seismic source excitation intervals needs to be adjusted), the underwater acoustic communication unit 6 obtains the updated user settings from the sea surface control terminal, and the CPU 2 sends instructions to the high-voltage pulse generator 5 based on the updated user settings to excite seismic waves. When the user settings are not stored in the memory 3 in advance, the CPU 2 can acquire the user settings directly from the sea surface control terminal through the underwater acoustic communication unit 6; and when the user settings need to be updated, the underwater acoustic communication unit 6 obtains the updated user settings from the sea surface control terminal.

After the seismic waves are excited, the CPU 2 controls the high-voltage pulse generator 5 to accumulate energy to a specified level (i.e., the high-voltage pulse generator is charged) to prepare for the next seismic wave excitation. The seismic waves will be excited immediately after the pulse emission instruction is received from the CPU 2 again. The above steps are repeated again and again.

The seismic source excitation mode operates as follows.

The CPU 2 is connected with the multiple discharge pathways of the high-voltage pulse generator 5, and can control the on-off of any discharge pathway. The seismic source excitation mode includes a shear wave mode and a compression wave mode; wherein in the shear wave mode, the CPU 2 simultaneously controls any two discharge pathways to switch on; and in the compression wave mode, the CPU 2 simultaneously controls the four discharge pathways to switch on.

Specifically, in the shear wave excitation mode (the shear wave mode mentioned above), two of the four vibrators that form the multi-wave excitation array are excited synchronously each time to excite shear waves in the seafloor sedimentary layer. As shown in FIGS. 8a to 8f, there are six combinations of synchronously excited vibrators, i.e., the first vibrator 111 & the second vibrator 112, the third vibrator 113 & the fourth vibrator 114, the second vibrator 112 & the third vibrator 113, the fourth vibrator 114 & the first vibrator 111, the first vibrator 111 & the third vibrator 113, and the second vibrator 112 & the fourth vibrator 114. Therefore, in a first excitation mode, the first vibrator and the second vibrator vibrate synchronously; in a second excitation mode, the third vibrator and the fourth vibrator vibrate synchronously; in a third excitation mode, the second vibrator and the third vibrator vibrate synchronously; in a fourth excitation mode, the fourth vibrator and the first vibrator vibrate synchronously; in a fifth excitation mode, the first vibrator and the third vibrator vibrate synchronously; in a sixth excitation mode, the second vibrator and the fourth vibrator vibrate synchronously.

The shear waves excited in the first excitation mode and the shear waves excited in the second excitation mode are opposite in polarity.

The shear waves excited in the third excitation mode and the shear waves excited in the fourth excitation mode are opposite in polarity.

The shear waves excited in the fifth excitation mode and the shear waves excited in the sixth excitation mode are opposite in polarity.

Subtraction of seismic wave signals with opposite polarity received by the an OBS matched with the seafloor multi-wave seismic source can enhance the amplitude of shear waves, attenuate or offset the amplitude of compression waves in seismic waves, and improve the signal-to-noise ratio of shear waves in seismic data.

Figure 9A:
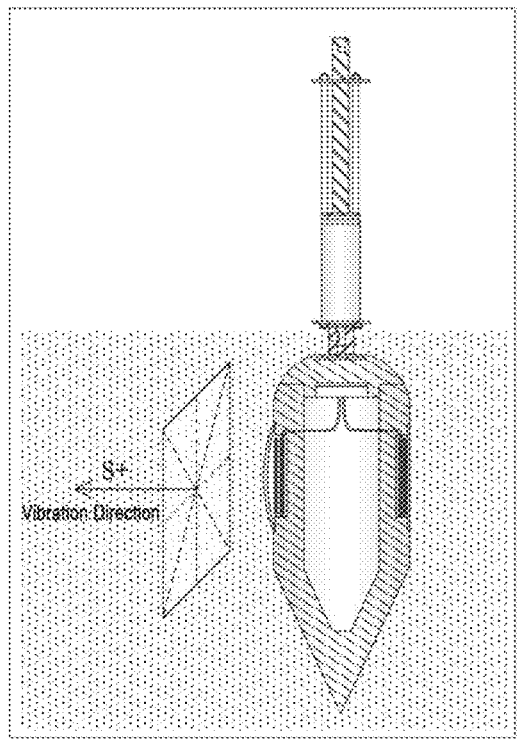
FIGS. 9a and 9b are schematic diagrams of exciting shear waves.
Figure 9B:
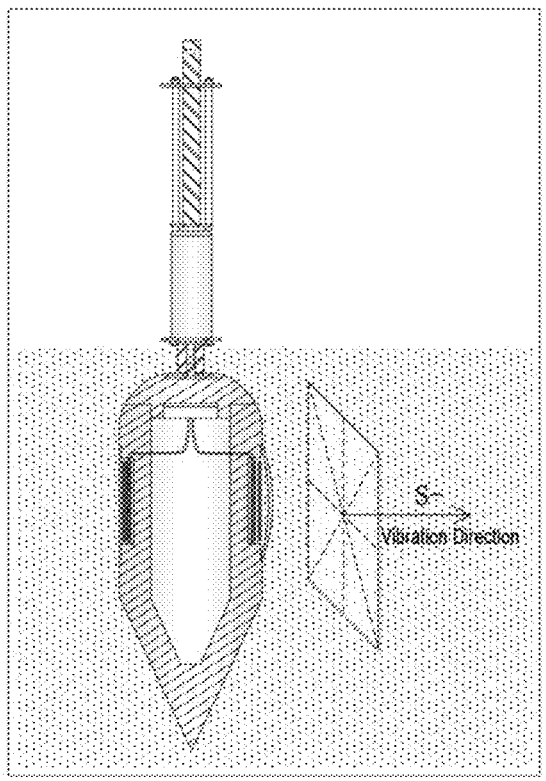

In the shear wave excitation mode, two of the four vibrators that form the multi-wave excitation array are excited synchronously each time to excite shear waves in sedimentary layer. As shown in FIG. 9, the vibration direction of the particle of shear waves is a horizontal direction parallel to the sea surface, and the propagation direction of shear waves is perpendicular to the vibration direction of the particle.

Figure 8A:
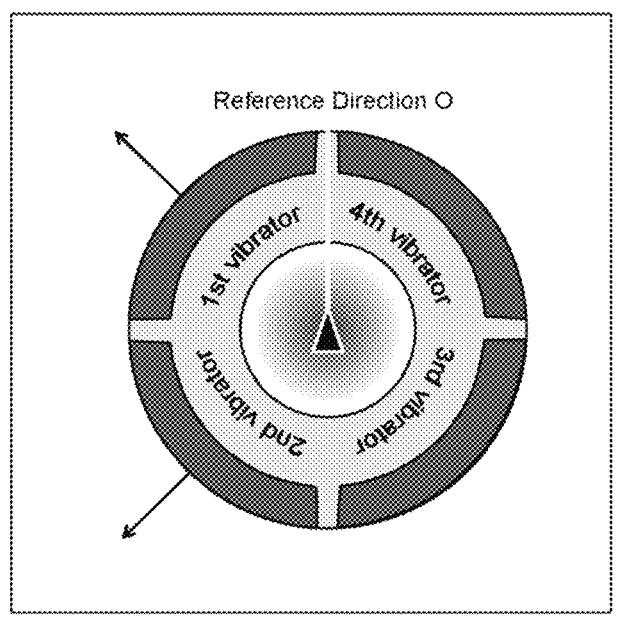
FIGS. 8a to 8f are schematic diagrams of exciting shear waves.
Figure 8B:
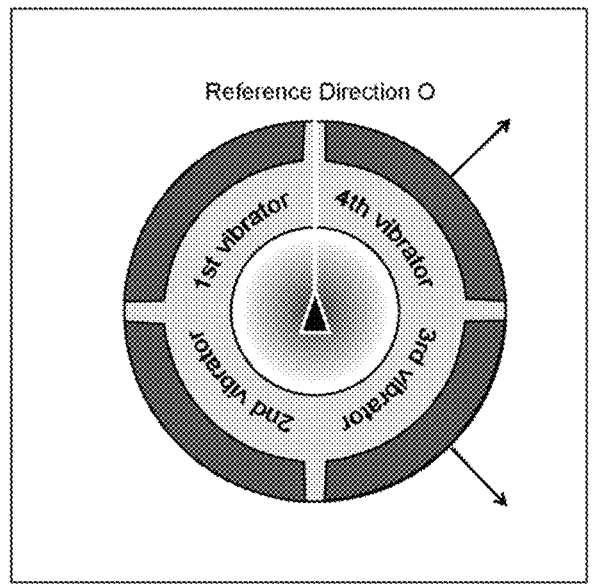
Figure 8C:
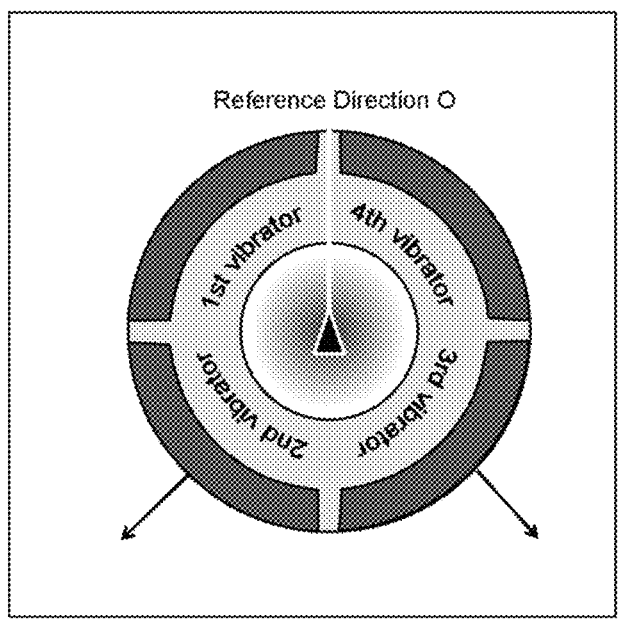
Figure 8D:
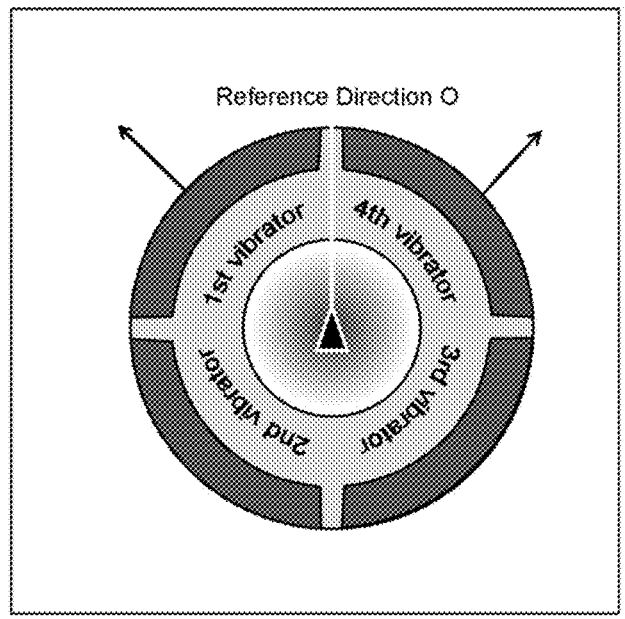
Figure 8E:
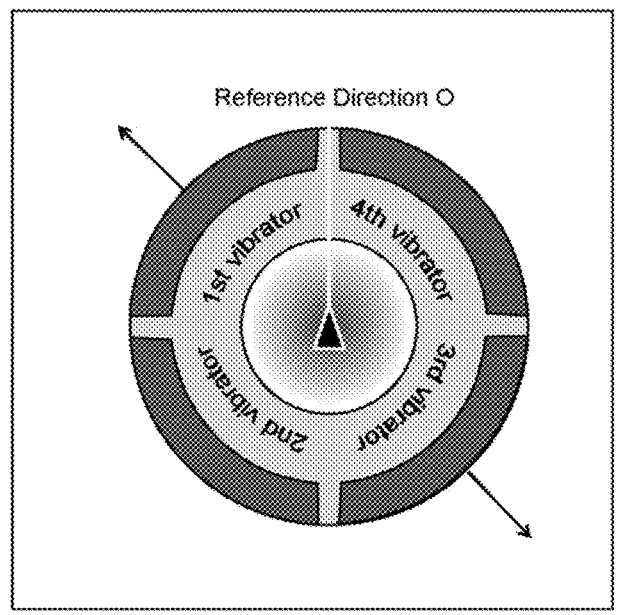
Figure 8F:
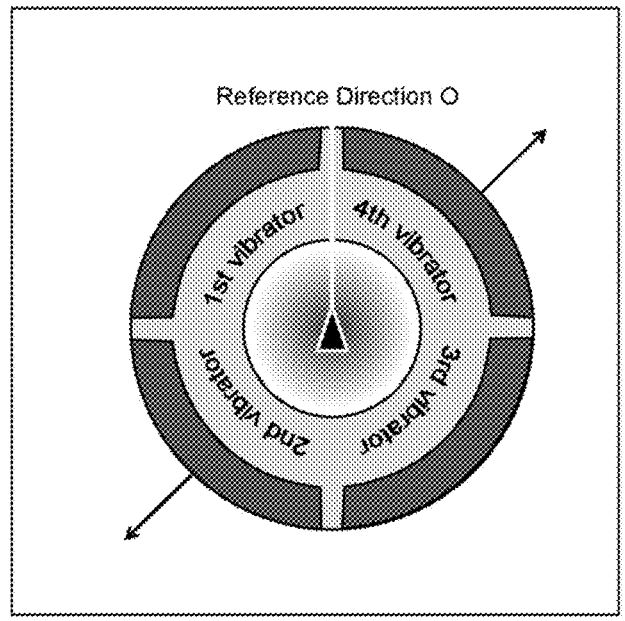
Figure 8G:
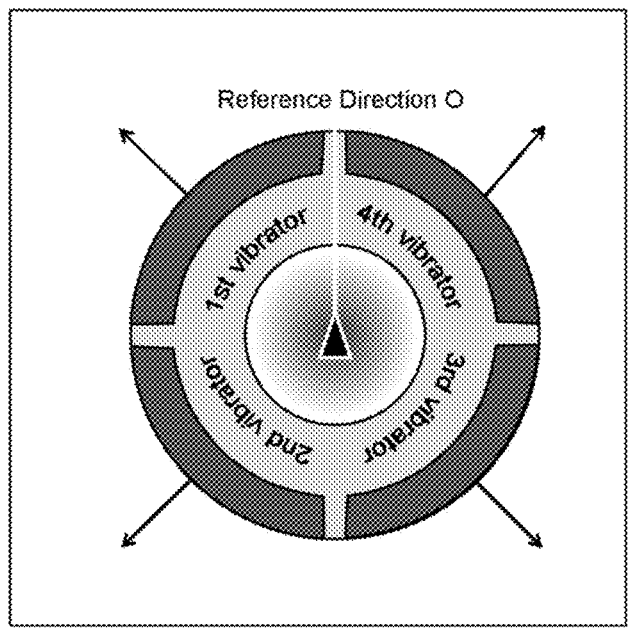
FIG. 8g is a schematic diagram of exciting compression waves.

In the compression wave excitation mode (the compression wave mode mentioned above), that is, the seventh excitation mode, all the four vibrators that form the multi-wave excitation array are excited synchronously each time to excite compression waves in sedimentary layer, as shown in FIG. 8g.

Shear waves propagate slowly with short wave length, and the characteristics of wave groups near the shallow stratum are more abundant, with higher longitudinal resolution and lateral resolution, so shear waves can better characterize the structure of shallow sedimentary layer. However, the traditional exploration, data acquisition, processing and interpretation technology of compression waves is more mature; the compression wave and shear wave joint acquisition, processing and interpretation can improve the characterizing capability of the sedimentary layer structure and the prediction accuracy of sedimentary layer properties.

The velocity of shear waves is generally only half of the compression waves, so the longitudinal resolution of shear waves is 2 times higher than that of compression waves, and the lateral resolution of shear waves is 1.4 times higher than that of compression waves.

Conventionally, the standard excitation energy is set as about 10 J, which may also be adjusted according to actual requirements.

As for the seismic source excitation intervals, the time interval between two excitations of the same mode depends on the charging rate of the high-voltage pulse generator, and the minimum interval may be within 10 s. Because of good repetition of two excitations of the same mode, multiple excitations superposed can significantly improve the energy and acquisition signal-to-noise ratio of the seismic source. Different shear wave excitation modes, and the shear wave excitation mode and the compression wave excitation mode may be switched seamlessly, i.e., the minimum excitation interval between different modes may be 0 s.

Figure 5A:
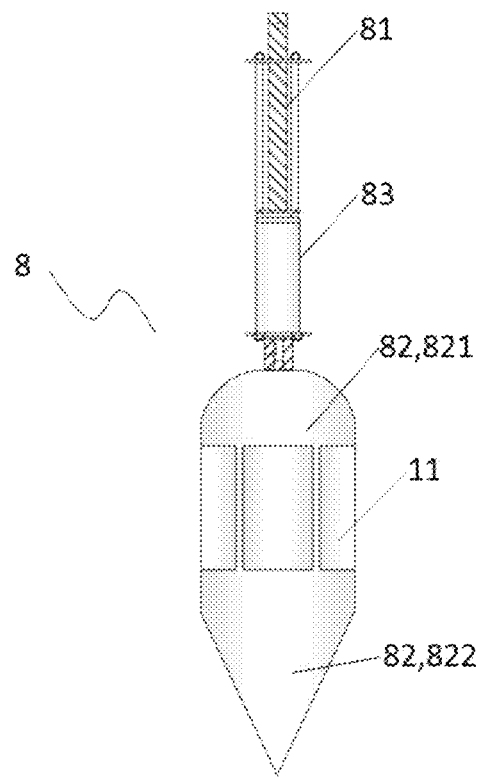
FIG. 5a is a structural diagram of a seismic source thrust mechanism according to one embodiment.
Figure 5B:
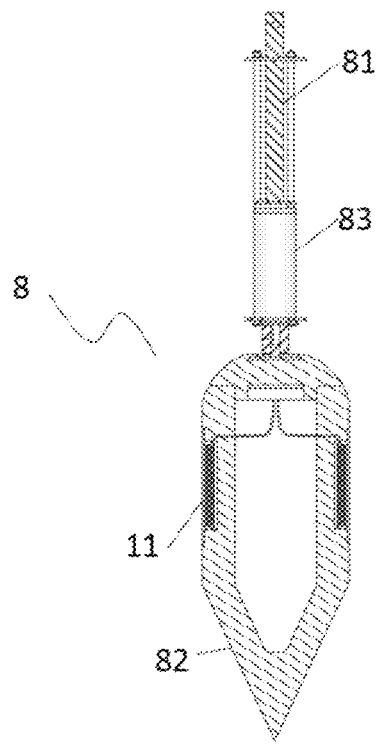
FIG. 5b is a section view of the seismic source thrust mechanism according to one embodiment.

In some embodiments of the present application, the seismic source thrust mechanism 8 may further include a motor 83. The thrust rod 81 of the seismic source thrust mechanism 8 is movably mounted on the bracket 10 and can rotate and move up and down with respect to the bracket 10. The motor 83 is connected with the thrust rod 81 to control the thrust rod 81 to rotate and move up and down. As shown in FIG. 5, the thrust rod 81 is a screw rod, the motor 83 is mounted thereon, and is driven by the motor 83 to spirally rotate and move up and down.

The program further includes: startup instructions from the CPU 2 for starting the motor 83 to start operation; and stop instructions from the CPU 2 for stopping the motor 83 to stop operation. By the operation of the motor 83, the seismic source thrust mechanism 8 may be more stably inserted into the sedimentary layer to facilitate the emission of seismic waves, or be pulled back from the sedimentary layer to facilitate recovery. Preferably, the motor 83 is a stepping motor to determine the position of the thrust rod 81, so as to determine whether the thrust rod is inserted into the sedimentary layer. Alternatively, a displacement sensor may be provided to determine the position of the thrust rod 81.

Important components are contained in the pressure chamber mechanism 1, mainly the information carriers which need to be recovered after the research is completed. In order to solve the problem of recovering the seafloor multi-wave seismic source after use, the seafloor multi-wave seismic source further includes a counterweight base 12, and the pressure chamber mechanism is mounted on the counterweight base 12 through a release mechanism (not shown). Generally, the pressure chamber mechanism 1 is made of a material with high buoyancy, and its interior is a sealed space, so that the seafloor multi-wave seismic source detached from the counterweight base 12 can rise to the sea surface for easy salvage. The counterweight base 12 is made of a high dense metal material, such as steel, so that the entire seafloor multi-wave seismic source can sink into the sea during layout. When the release mechanism operates, the counterweight base 12 and the pressure chamber mechanism 1 are disconnected, and the counterweight base 12 drops out. The seismic source frame 9, the pressure chamber mechanism 1 and other components are recovered to the sea surface. In the present embodiment, the release mechanism may be a release device in the prior art, e.g., the electromagnetic acoustic release device described in CN112612058A or the acoustic release mechanism described in CN112462429A, which can release the counterweight base 12 under the control of the CPU 2. Therefore, the program further includes: release instructions from the sea surface control terminal and received by the underwater acoustic communication unit 6, for releasing the counterweight base 12; the release instructions are sent to the CPU 2; and the CPU 2 controls the release mechanism to release the counterweight base 12.

The seafloor multi-wave seismic source further includes a hydrophone 13 disposed on an outer wall of the pressure chamber mechanism. Specifically, in the present embodiment, the hydrophone is disposed on an outer wall of the second pressure chamber 102 for receiving wavelet signals. The wavelet signal is a seismic wave signal emitted from the vibrators 11 of the seafloor multi-wave seismic source, and may contain compression wave and shear wave data. By receiving wavelet signals, it can monitor whether the seafloor multi-wave seismic source operate normally and emits seismic wave signals normally. Therefore, the program further includes: instructions received by the hydrophone 13 for acquiring wavelet signals in real time and storing the acquired wavelet signals in the memory; and determining, by the CPU 2, whether the hydrophone 13 normally receives wavelet signals or not; if so, it is judged that the seafloor multi-wave seismic source is in normal operation; if not, it is judged that the seafloor multi-wave seismic source or the hydrophone 13 is malfunctioning.

In some embodiments of the present application, in order to facilitate the positioning and time service for the seafloor multi-wave seismic source, the seafloor multi-wave seismic source further includes a radio determination satellite system 14 (RDSS) and a local clock (usually located in a real-time clock chip, and the CPU can read and correct the local clock). For example, the Beidou RDSS may be adopted to provide Beidou positioning, time service and short message service for the seafloor multi-wave seismic source. The local clock provides clock information for the CPU 2 during the operation of the seafloor multi-wave seismic source on the seafloor. Before operation, time service signal of the RDSS 14 assists in correcting the local clock to the Coordinated Universal Time (UTC) clock. After operation (after floating to the sea surface), the time service signal of the RDSS 14 corrects the local clock to the UTC clock, records the difference between the local clock and the UTC clock before the clock correction, generates a clock difference file with the current local clock, the UTC clock and the difference, and inputs the file in the memory. When the RDSS 14 operates, the CPU 2 can control to power off the RDSS 14 for power saving.

Optionally, the seafloor multi-wave seismic source further includes a human-machine interface (HMI) unit 15 disposed in the pressure chamber mechanism 1 and connected with the CPU 2. The HMI unit 15 has an I/O interface, which, for example, may be a USB interface, a WIFI interface, etc., configured to input user settings before the layout of seismic sources and get back the stored data after the recovery of seismic sources.

Optionally, in the present embodiment, the CPU may serve as a master computer, and a slave computer is additionally provided to control the components; the slave computer may be hardware devices such as single-chip microcomputer, PLC, MCU and FPGA etc. capable of implementing corresponding functions. The slave computer includes a thrust unit 16, a release unit 17 and a wavelet recording unit 18; wherein, the thrust unit 16 is configured to communicate with the motor 83 and receive instructions from the CPU 2 to control the on or off of the motor 83, to control the thrust rod 81 to rotate and move up and down, so that the seismic source thrust mechanism 8 can be inserted into or pulled back from the seafloor. The release unit 17 is configured to communicate with the release mechanism and receive release instructions from the CPU 2 to control the startup of the release mechanism, to control the connection between the counterweight base 12 and the pressure chamber mechanism 1. The wavelet recording unit 18 is configured to communicate with the hydrophone 13 to receive and store wavelet signals from the hydrophone 13. The hydrophone 13 acquires shear wave or compression wave data of the seafloor multi-wave seismic source, and the wavelet recording unit is used to record near-field wavelet signals of acoustic waves excited by the seismic source. Different from the previous embodiments, in the present embodiment, by providing the master computer and the slave computer, the CPU 2 does not need to directly control the motor 83, the release mechanism and the hydrophone 13, but use the corresponding slave computer to received instructions for control and feedback.

In some embodiments of the present application, a compass 19 is further provided in the first pressure chamber 5, and the CPU 2 receives signals from the compass to obtain geographic orientation information of seafloor shear wave seismic source distributed on the seafloor.

The power supply unit 7 of the seafloor multi-wave seismic source may be a storage battery, which is mainly configured to power electric equipment in the pressure chamber mechanism 1. The power supply unit 7 may be divided into two independent power sources. The first power source is configured to power the CPU 2, the underwater acoustic communication unit 6, the release unit 17, the Beidou RDSS 14, the HMI unit 15, the wavelet recording unit 18 and other equipment located in the first pressure chamber 101. The second power source is configured to power the thrust unit 16 and high-voltage pulse generator 5 located in the second pressure chamber 102, as well as the multi-wave excitation array outside the pressure chamber mechanism and other equipment.

In a second embodiment of the present application, a seafloor exploration system is provided. The seafloor exploration system includes the seafloor multi-wave seismic source mentioned above and an ocean bottom seismometer (hereinafter referred to as seismic source and OBS respectively), and the OBS can communicate with the seismic source to receive data of the seismic source.

Figure 10:
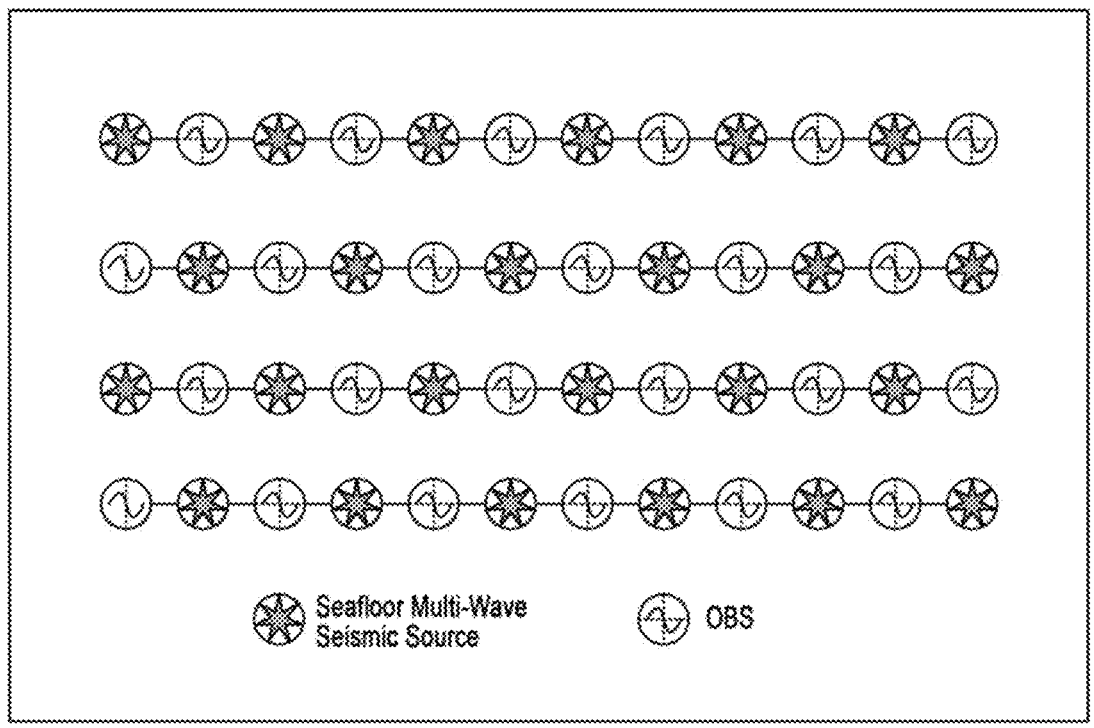
FIG. 10 is a schematic diagram of a seafloor exploration system according to one embodiment.

FIG. 10 is a schematic diagram of the seafloor exploration system according to one embodiment, which includes multiple exploration rows, and any two adjacent exploration rows form an exploration subsystem consisting of a first exploration row and a second exploration row. The first exploration row and the second exploration row both includes the OBSs and the seismic sources arranged at intervals. The seismic sources in the first exploration row are corresponding to the OBSs in the second exploration row. Optionally, the OBSs and seismic sources in each exploration row are arranged alternately. The entire seafloor exploration system consists of multiple groups of exploration subsystems arranged in sequence, which can form a matrix with M rows and N columns.

Figure 11:
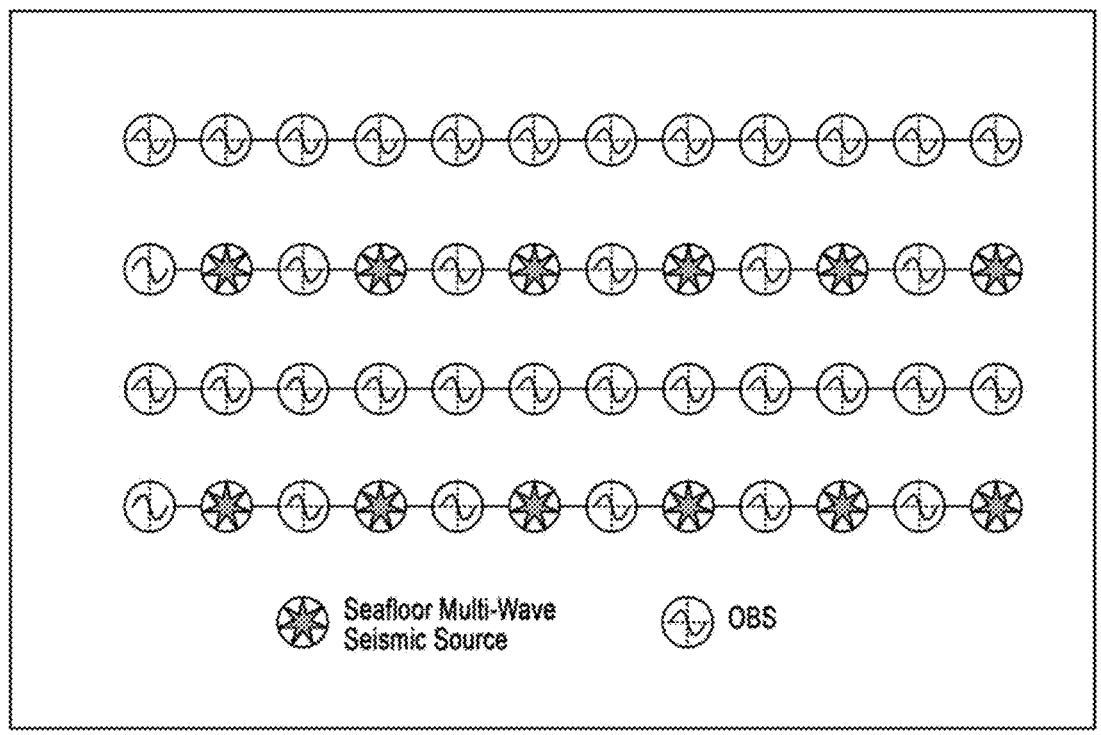
FIG. 11 is a schematic diagram of a seafloor exploration system according to one embodiment.

FIG. 11 is a schematic diagram of the seafloor exploration system of another embodiment, which includes multiple exploration rows, and any two adjacent exploration rows form an exploration subsystem consisting of a first exploration row and a second exploration row. The first exploration row is the same as that of FIG. 10, including the OBSs and the seismic sources arranged at intervals, and optionally, arranged alternately. The second exploration row is different from that of FIG. 10, only including the OBSs arranged at intervals. Both the seismic sources and the OBSs in the first exploration row are corresponding to the OBSs in the second exploration row. The entire seafloor exploration system consists of multiple groups of exploration subsystems arranged in sequence, which can form a matrix with M rows and N columns.

Figure 12:
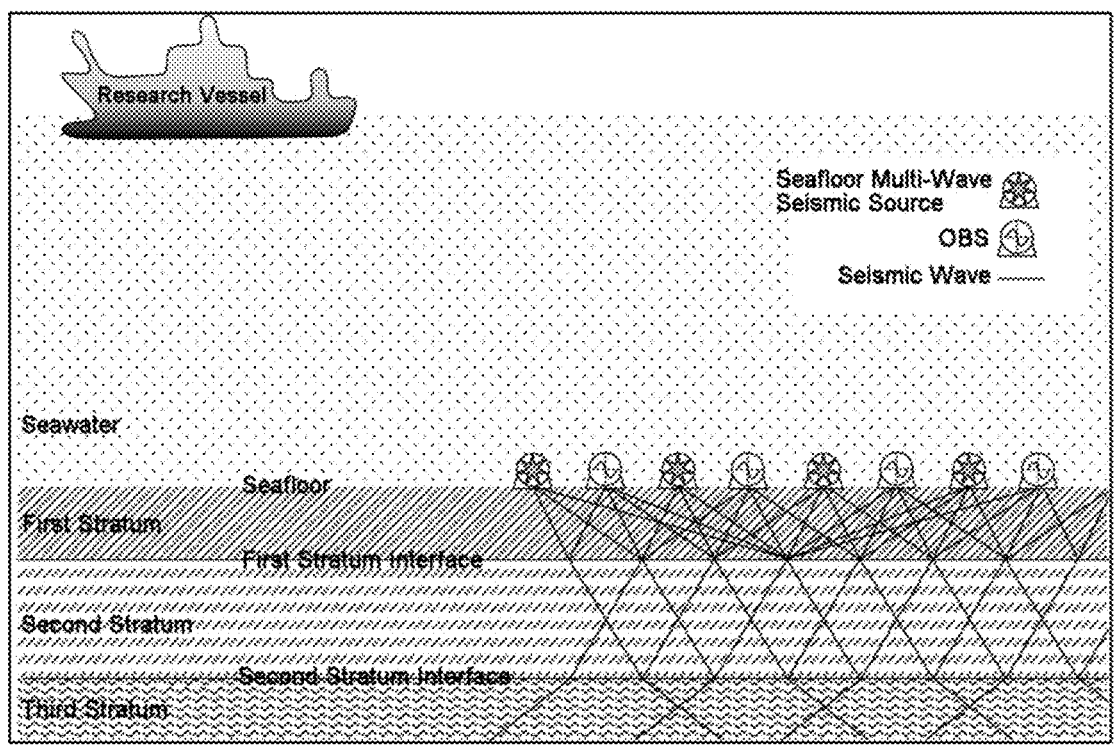
FIG. 12 is an operating diagram of the seafloor exploration system according to one embodiment.

The three dimensional (3D) seismic operation model is shown in FIG. 12.

The seismic sources and the OBSs are spaced for collaborative operation. The seismic sources and the OBS can work together for two dimensional (2D) seismic operations as well as 3D seismic operations.

For 2D survey lines, the user provides the seismic sources with the geographic angle for distributing survey lines. Upon the layout of the seismic sources, the CPU automatically controls the seismic source thrust mechanism to rotate to coincide the reference direction O with the given survey line angle, i.e., to make the survey line direction lie in the propagation plane of the shear wave. For example, all stations (including the seismic sources and the OBSs) are distributed on a due north-south survey line, and the geographic angle of the survey line is set to 0 degree. After distributed, the CPU automatically controls the seismic source thrust mechanism to rotate to make the reference direction O point to the geographical north, i.e., the vibration direction of the vibrators is perpendicular to the given survey line angle. During operation, shear waves are excited by the first and second excitation modes, and compression waves are excited by the seventh excitation mode. The survey line with a given length is divided into equally spaced nodes, and the OBSs and the seismic sources are distributed in a given proportion at the corresponding nodes. Given that the length of the 2D survey line is L, the total number of the OBSs and seismic sources distributed is N (also called the number of nodes), and the distribution distance is δ, L=(N−1)×δ. For example, the OBSs and the seismic sources are distributed in a proportion of 1:1 or 2:1 at the corresponding nodes.

For 3D survey lines, given that the length of each 2D survey line is L, the total number of the OBSs and seismic sources distributed is N (also called the number of nodes) on each 2D survey line, and the distribution distance is δ, L=(N−1)×δ. For example, the OBSs and the seismic sources are distributed in a proportion of 1:1 at the corresponding nodes on each 2D survey line (FIG. 10), or only the OBSs are distributed on some 2D survey lines (FIG. 11). In this way, in a 3D survey network, each seismic source is surrounded by multiple OBSs, and seismic waves excited by each seismic source may be received by the multiple OBSs surrounded, thus improving the operation efficiency. For 2D survey lines, the user provides the seismic sources with a geographic angle for distributing the survey lines. Upon the layout of the seismic sources, the CPU automatically controls the seismic source thrust mechanism to rotate to coincide the reference direction O with the given survey line angle, i.e., to make the survey line direction lie in the propagation plane of the shear wave. For example, all stations (including the seismic sources and the OBSs) are distributed on a due east-west survey line, and the geographic angle of the survey line is set to 90 degree. After distributed, the CPU automatically controls the seismic source thrust mechanism to rotate to make the reference direction O point to the geographical east, i.e., the vibration direction of the vibrators is perpendicular to the given survey line angle. During operation, shear waves are excited by the first, second, third, fourth, fifth and sixth excitation modes, and the propagation direction of shear waves differs in different excitation modes and the waves can be received by the OBSs surrounded in different directions. The compression waves are excited by the seventh excitation mode.

One-way propagation loss of acoustic waves in seawater is related to the depth of the seawater, and the loss calculation formula is 20 log H, where H is the depth of the seawater. As for seawater with 1,000 m depth, the one-way propagation loss of acoustic waves in seawater is 60 dB, and the greater the depth, the greater the propagation loss. The seismic sources and the OBSs in the present application are both distributed on the seafloor; the seismic waves are excited at the seafloor, thus there is no need to propagate the waves to the sea surface through seawater, avoiding energy loss due to long-distance propagation of excited seismic waves in seawater, being suitable for deep-water geophysical exploration, and improving the penetration depth into strata.

Also, since the seismic source and the OBSs are both distributed on the seafloor, the propagation distance of seismic waves between the excitation position and a reception position can be effectively reduced, thus reducing the Fresnel radius, improving the resolution of strata, and facilitating the fine seismic exploration of undersea mineral deposits.

The seafloor exploration is carried out using the seafloor exploration system with the seafloor multi-wave seismic sources as follows.

Before layout, a PC is connected to the seismic sources through the HMI unit.

The user inputs the user settings through the PC, including seismic source excitation modes, seismic source excitation energy, seismic source excitation intervals, etc. The seismic source excitation modes are divided into a test mode, an operation mode, etc. In the test mode, the seismic source is tested once to judge if it works normally. The operation mode includes the first excitation mode, the second excitation mode, the third excitation mode, the fourth excitation mode, the fifth excitation mode, the sixth excitation mode, and the compression wave excitation mode (namely the seventh excitation mode). The excitation energy is set to be 10 J, the excitation interval is set to be 60 s, and the start time and end time at which the seismic source operates are set. The CPU automatically generates a task list including operation mode, operation duration, operation interval, etc.

The seismic source, with its upper portion uncovered, is moved to an open area on an operation deck. The Beidou RDSS receives satellite time service information, and the CPU corrects the local clock to the UTC clock with the millisecond accuracy or even higher.

The research vessel stops at the designated station.

The seismic source main body is connected to the counterweight base; and the underwater acoustic communication unit, the release unit and other modules are tested. After these modules pass the test, the seismic source is lifted up to the sea surface. The unhooked seismic source will freely fall onto the seafloor at a speed generally not greater than 1 m/s.

While the seismic source is falling, the Beidou RDSS power is turned off by itself, for power saving.

After the seismic source is landed on the seafloor, multi-wave excitation array is controlled by the CPU to excite seismic waves based on the user settings inputted in advance.

At the presetting start time (e.g., 00:00:00 on Jan. 1, 2021), the seismic source starts to excite seismic waves, with the energy of 10 J and an interval of 60 s, and at the presetting end time (e.g., 00:00 on Feb. 12, 2021), the seismic wave excitation ends.

The research vessel sails to the next layout station and continues to lay other seismic sources.

Upon completion of seismic exploration, the research vessel sails to the vicinity of each station to recover the seismic sources.

The research vessel stops at the designated recovery station.

The research vessel sends release instructions through the sea surface control terminal. After the release instruction is recognized by the seismic source at the current station, the release unit performs and the release mechanism acts to detach the counterweight base from the seismic source main body.

After the counterweight base is detached from the seismic source main body, the seismic source main body floats up freely to the sea surface under the positive buoyancy.

After the seismic source is floating to the sea surface, the Beidou RDSS power is turned on by itself. The Beidou RDSS is responsible time service, positioning and short message service.

When the seismic source rises freely to the sea surface and after the Beidou RDSS searches for the satellite, the satellite time service information is received, and the CPU corrects the local clock to the UTC clock. The CPU records the difference between the local clock and the UTC clock before the clock correction, generates a clock difference file with the current local clock, the UTC clock and the difference, and inputs the file in the memory.

When the seismic source rises freely to the sea surface and after the Beidou RDSS searches for the satellite, the current precise coordinate position is located, the seismic source condition and coordinate position are sent to the research vessel and an onshore base by short message. The research vessel sails to the current precise position of the seismic source based on the received short message, and salvages the seismic source. The Command and Dispatch Department of the onshore base may also receive the short message from the seismic source synchronously to get information such as the seismic source condition and position.

The research vessel sails to the next recovery station and continues to recover other seismic sources.

The embodiments are only described as preferred embodiments of the present application, and are not intended to limit the scope of the present application. Various modifications and improvements made on the technical solutions of the present application by ordinary skill in the art without departing from the design spirit of the present application shall fall within the protective scope confirmed by the claims of the present application.

The invention claimed is:

1. A seafloor multi-wave seismic source, comprising: a pressure chamber mechanism; a high-voltage pulse generator, comprising four discharge pathways and located in the pressure chamber mechanism; a seismic source thrust mechanism, comprising a thrust rod and a thrust head mounted at one end of the thrust rod; four vibrators are evenly distributed around a periphery of the thrust head, and each vibrator is connected with one discharge pathway of the high-voltage pulse generator; a power supply unit, configured to power the seafloor multi-wave seismic source; and at least one processor, a memory and at least one program, wherein the at least one program is stored in the memory and configured to be executed by the at least one processor; and the at least one program includes: pulse emission instructions generated by the at least one processor based on user settings and received by the high-voltage pulse generator, for switching on four or any two of the four discharge pathways at the same time, to enable the corresponding vibrators to vibrate to excite seismic waves in compression wave mode or shear wave mode; wherein a hydrophone is disposed on an outer wall of the pressure chamber mechanism and configured to receive wavelet signals; the at least one program further includes: instructions received by the hydrophone for acquiring wavelet signals in real time and storing the acquired wavelet signals in the memory; and the at least one processor determines whether the hydrophone normally receives wavelet signals or not; if the wavelet signals are received normally, it is judged that the seafloor multi-wave seismic source is in normal operation; if the wavelet signals are not received normally, it is judged that the seafloor multi-wave seismic source or the hydrophone is malfunctioning.

2. The seafloor multi-wave seismic source according to claim 1, wherein, the seafloor multi-wave seismic source is located on the seafloor during operation and further includes an underwater acoustic communication unit configured to communicate with an sea surface control terminal; the at least one program includes: instructions received by the underwater acoustic communication unit, for acquiring user settings from or updating user settings by the sea surface control terminal and sending the acquired or updated user settings to the at least one processor; the user settings include a seismic source excitation mode, seismic source excitation energy and a seismic source excitation interval, and the seismic source excitation mode comprises the shear wave mode and the compression wave mode.

3. The seafloor multi-wave seismic source according to claim 2 wherein, further comprising a counterweight base, and the pressure chamber mechanism is mounted on the counterweight base through a release mechanism; the at least one program further includes: release instructions from the sea surface control terminal and received by the underwater acoustic communication unit, for releasing the counterweight base; the received release instructions are sent to the at least one processor; and the at least one processor controls the release mechanism to release the counterweight base.

4. The seafloor multi-wave seismic source according to claim 1, wherein, the thrust head of the seismic source thrust mechanism includes a thrust head main body and a head portion, wherein a periphery of the thrust head main body is a cylinder or a rectangular prism, the four vibrators are distributed evenly and symmetrically along the periphery of the thrust head main body, and the head portion is a cone.

5. The seafloor multi-wave seismic source according to claim 1, wherein, the seismic source thrust mechanism further includes a bracket and a motor; the seismic source thrust mechanism is mounted through the bracket, and the thrust rod is movably mounted on the bracket; the motor is connected with the thrust rod to drive the thrust rod to rotate or move up and down; and the at least one program further includes: startup instructions from the at least one processor for starting the motor to start operation; and stop instructions from the processor for stopping the motor to stop operation.

6. The seafloor multi-wave seismic source according to claim 5, wherein, the motor is a stepping motor, and the thrust rod is a screw rod body; and the stepping motor is connected with the screw rod body to drive the screw rod body to rotate and move up and down.

7. The seafloor multi-wave seismic source according to claim 1, wherein, each vibrator includes: an insulating shell; a flexible protective film connected with and spaced from the insulating shell to form a vibrator cavity; a metal sheet mounted in the vibrator cavity and connected with the flexible protective film; and a coil disposed on the metal sheet and connected with one discharge pathway of the high-voltage pulse generator; and the vibrator is connected to the thrust head through the insulating shell.

8. The seafloor multi-wave seismic source according to claim 7, wherein, there are 20-40 turns of the coil of each vibrator; a volume of the vibrator cavity of each vibrator is 5 to 50 cm3; and an instantaneous voltage output from the high-voltage pulse generator is about 1000V.

9. The seafloor multi-wave seismic source according to claim 1, wherein, the high-voltage pulse generator is provided with a multiplex storage capacitor circuit, including four storage capacitor banks each comprising one or more high-voltage pulse capacitors connected in parallel; an output terminal of each storage capacitor bank is correspondingly connected to one vibrator; and two ends of each storage capacitor bank are respectively provided with an isolating diode; and the high-voltage pulse generator further includes a multiplex switch circuit, including four discharge circuits; an input terminal of each discharge circuit is connected to one storage capacitor bank correspondingly, while an output terminal of the discharge circuit is connected to one vibrator correspondingly; each discharge circuit further includes a set of solid-state switch and flywheel diode, wherein the solid-state switch is connected in series with the corresponding vibrator and the flywheel diode is connected in parallel with the corresponding vibrator.

10. The seafloor multi-wave seismic source according to claim 1, further includes a HMI unit disposed in the pressure chamber mechanism and connected with the at least one processor; and the HMI unit is provided with an I/O interface configured to input user settings and retrieve seismic source data.

11. The seafloor multi-wave seismic source according to claim 1, further comprising a RDSS and a local clock, wherein the RDSS provides positioning service, time service and short message service for the seafloor multi-wave seismic source and the local clock provides clock information for the at least one processor; and the pressure chamber mechanism is further provided with a compass, and the at least one processor receives signals from the compass to obtain geographic orientation information of the seafloor multi-wave seismic source.

12. The seafloor multi-wave seismic source according to claim 3, wherein, the seismic source thrust mechanism further includes a bracket and a motor; the seismic source thrust mechanism is mounted through the bracket, and the thrust rod is movably mounted on the bracket; the motor is a stepping motor, and the thrust rod is a screw rod body; the motor is connected with the thrust rod to drive the thrust rod to rotate or move up and down; and the at least one program further includes: startup instructions from the at least one processor for starting the motor to start operation; and stop instructions from the at least one processor for stopping the motor to stop operation.

13. The seafloor multi-wave seismic source according to claim 1, wherein, the seafloor multi-wave seismic source includes a master computer and a slave computer, the at least one processor is the master computer, and the slave computer includes a thrust unit, a release unit and a wavelet recording unit; wherein the thrust unit is configured to communicate with a motor and receive instructions from the at least one processor to control the startup and stop of the motor; the release unit is configured to communicate with the release mechanism and receive release instructions from the at least one processor to control the startup of the release mechanism; and the wavelet recording unit is configured to communicate with the hydrophone to receive and store the wavelet signals from the hydrophone.

14. The seafloor multi-wave seismic source according to claim 1, further comprising a HMI unit disposed in the pressure chamber mechanism and connected with the at least one processor; and the HMI unit is provided with an I/O interface configured to input user settings and retrieve seismic source data; the seafloor multi-wave seismic source further includes a RDSS and a local clock, wherein the RDSS provides positioning service, time service and short message service for the seafloor multi-wave seismic source and the local clock provides clock information for the at least one processor; and the pressure chamber mechanism is further provided with a compass, and the at least one processor receives signals from the compass to obtain geographic orientation information of the seafloor multi-wave seismic source.

15. The seafloor multi-wave seismic source according to claim 12, wherein, each vibrator includes: an insulating shell; a flexible protective film connected with and spaced from the insulating shell to form a vibrator cavity; a metal sheet mounted in the vibrator cavity and connected with the flexible protective film; and a coil disposed on the metal sheet and connected with one discharge pathway of the high-voltage pulse generator; and the vibrator is connected to the thrust head through the insulating shell.

16. A seafloor exploration system, comprising at least one seafloor multi-wave seismic source and at least one ocean bottom seismometer; wherein the seafloor multi-wave seismic source is the seafloor multi-wave seismic source according to claim 1; and the ocean bottom seismometer receives seismic waves excited by the seafloor multi-wave seismic source, including shear waves and compression waves.

17. The seafloor exploration system according to claim 16, wherein, the seafloor exploration system comprises a plurality of exploration rows, and any two adjacent exploration rows form an exploration subsystem consisting of a first exploration row and a second exploration row; the first exploration row and the second exploration row both include the ocean bottom seismometers and the seafloor multi-wave seismic sources arranged at intervals; and the seafloor multi-wave seismic sources in the first exploration row are located correspondingly to the ocean bottom seismometers in the second exploration row.

18. The seafloor exploration system according to claim 16, wherein, the seafloor exploration system comprises a plurality of exploration rows, and any two adjacent exploration rows form an exploration subsystem consisting of a first exploration row and a second exploration row; the first exploration row includes the ocean bottom seismometers and the seafloor multi-wave seismic sources arranged at intervals, and the second exploration row includes the ocean bottom seismometers arranged at intervals; and the seafloor multi-wave seismic sources and the ocean bottom seismometers in the first exploration row are located correspondingly to the ocean bottom seismometers in the second exploration row.

* * * * *